(12) United States Patent
Steiner

(10) Patent No.: US 8,504,717 B2
(45) Date of Patent: Aug. 6, 2013

(54) CUSTOMIZED ALGORITHM AND METHOD OF MIXING MULTIPLE DIFFERENT ALGORITHMS

(75) Inventor: Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 516 days.

(21) Appl. No.: 12/569,615

(22) Filed: Sep. 29, 2009

(65) Prior Publication Data

US 2011/0078329 A1 Mar. 31, 2011

(51) Int. Cl.
*G06F 15/173* (2006.01)
*G06F 12/00* (2006.01)

(52) U.S. Cl.
USPC .......................................... 709/238; 709/244

(58) Field of Classification Search
USPC ................. 709/201–202, 226, 238, 240, 244; 718/105
See application file for complete search history.

(56) References Cited

U.S. PATENT DOCUMENTS

| | | | | |
|---|---|---|---|---|
| 6,611,590 | B1 * | 8/2003 | Lu et al. .................... | 379/265.09 |
| 2003/0018702 | A1 * | 1/2003 | Broughton et al. ........... | 709/202 |
| 2005/0043986 | A1 * | 2/2005 | McConnell et al. ............ | 705/11 |
| 2009/0190744 | A1 * | 7/2009 | Xie et al. ................. | 379/265.11 |

* cited by examiner

*Primary Examiner* — Zarni Maung
(74) *Attorney, Agent, or Firm* — Sheridan Ross P.C.

(57) ABSTRACT

Methods, devices, and systems are provided such that multiple existing algorithms can be mixed according to a customer's needs to create a customized mixed algorithm. Solutions are provided for dynamically selecting two or more different and existing algorithms to be mixed into a single algorithm. Arbitration rules can be invoked to determine which algorithm in the set of existing algorithms will supersede the other algorithms in the event of a conflict.

20 Claims, 4 Drawing Sheets

CUSTOMIZED ALGORITHM AND METHOD OF MIXING MULTIPLE DIFFERENT ALGORITHMS

FIELD

The present invention is directed generally to processing algorithms and more particularly to call processing algorithms such as those used in contact centers.

BACKGROUND

Contact centers are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day Automated Contact Distributors (ACDs) when the ACD system's controller detects that an agent has become available to handle a contact, the controller identifies all predefined contact-handling queues for the agent (usually in some order of priority) and delivers to the available agent the highest-priority oldest contact that matches the agent's highest-priority queue.

Contact routing algorithms employed by ACDs (and most algorithms in general) are designed for a single purpose. It is generally difficult to utilize a particular algorithm for one problem when it has been developed to address another problem. One common analogy is trying to fit a square peg into a round hole. When that purpose changes it is usually necessary to develop a new algorithm or some variant of the previous algorithm to be used for the new purpose. The problem with this approach is that the algorithm development and deployment time is somewhat long and customers will often have to wait for a customized solution to their particular problem, unless they don't mind trying to fit an existing algorithm (a square peg) into their problem (the round hole).

An example of a limited algorithm is Avaya's Business Advocate and fairness algorithms, both of which can be employed in a contact center context. Advocate does an excellent job of matching agents to work and maximizing things like profit, but in overload, Advocate uses the "best" agents the most and is not "fair". Fairness algorithms like occupancy and pacing consider agents but don't optimize goals like "most profit". These two algorithms are driven by different goals.

SUMMARY

It is thus one aspect of the present invention to provide a solution whereby multiple existing algorithms can be mixed according to a customer's needs to create a customized mixed algorithm. Specifically, in one particular configuration, a combination of currently available contact routing algorithms can be used in the context of a contact center. Examples of such algorithms include, without limitation: Advocate, Value-based, Occupancy, Pacing, etc. Each of these existing algorithms have certain strengths and certain weaknesses. Furthermore, some algorithms do not consider certain inputs when making a contact routing decision whereas others will rely on such inputs.

Embodiments of the present invention propose a solution that allows a customer to dynamically select two or more different and existing algorithms to be mixed into a single algorithm. When a mixed algorithm is used, there are arbitration rules that are invoked to help determine which algorithm in the existing algorithm will supersede the other algorithms in the event of a conflict. For example, if two different algorithms are designed to consider a particular input, then an arbitration engine would decide which algorithm of the two algorithms will receive the input for processing (or which algorithm will have the ability to construct a decision based on that input). If there is no input conflict, then the arbitration engine will automatically forward an input to the algorithm which considers such an input when generating an output decision. Similarly, outputs of each algorithm can be run through the arbitration engine which resolves any conflicts in output decisions, also according to an algorithm priority.

The settings of the arbitration engine may be user or administrator configurable. More specifically, a Graphical User Interface (GUI) is envisioned where each algorithm to be included in the mixed algorithm has a sliding scale associated therewith. A user or administrator can move the selection bar across the sliding scale of each algorithm to determine what mix of each algorithm will be used in the overall mixed algorithm. The user's indication that one algorithm should receive priority as compared to another algorithm can be used b the arbitration engine when resolving algorithm conflicts.

It is also envisioned that the arbitration engine may be adapted to resolve algorithm conflicts based on business rules. For example, a customer may simply define that minimal wait time is the highest priority whereas quality of skill matching is of lesser concern. This input can be used by the arbitration engine to resolve algorithm conflicts. Again, the customer's needs can be defined by a GUI or some other administrative tool. Furthermore, the business needs may vary according to the current needs of the customer. When the customer (e.g., a contact center administrator or operator in some instances) determines that they have new business needs they need not go through the hassle of creating a new algorithm. Rather, the rules of the arbitration engine can be altered and the overall performance of the mixed algorithm can adjust to meet the customer's current needs.

To continue with the previous example, a slider on a "fairness" gauge would determine how fair the other algorithm will be. For instance, on one end "not fair", the other algorithm determines all the decisions. On the other end, a fairness algorithm comes into play (like "pacing"). A pacing algorithm inserts rests into the agents work queue. Ideally, the setting of the levels would be by the arbitration engine, which would in this case look at the "profit goals", if the goals are being met, then give more "fairness", if we are not meeting the goals, be "less fair". Depending upon the algorithm which is given the highest priority, routing decisions can be made in accordance with any defined business goals such as reduce costs, decrease wait time, increase overall contact center utilization, or increase customer satisfaction (e.g., try to route the work item to the location closest to the originator of the work item).

Although the discussions herein are generally related to contact center routing algorithms and the use of such algorithms in a contact center context, embodiments of the present invention can be extended to any type of algorithm where inputs are used to produce one or more outputs, decisions, or events.

In accordance with at least some embodiments of the present invention a method is provided that generally comprises:

receiving, at a server comprising a work item distributor, one or more data inputs that describe conditions related to a contact center, wherein the server comprises a first algorithm adapted to consider a first set of inputs when generating an output and a second algorithm adapted to consider a second set of inputs when generating an output, wherein the first set of inputs are a subset of the one or more data inputs, and wherein the second set of inputs are a subset of the one or more data inputs; providing a first selected portion of the one or more data inputs to the first algorithm;

providing a second selected portion of the one or more data inputs to the second algorithm;

receiving, at the routing engine, outputs from the first and second algorithms, wherein the output of the first algorithm is based on the first algorithm processing the first selected portion of the one or more data inputs, and wherein the output of the second algorithm is based on the second algorithm processing the second selection portion of the one or more data inputs; and routing, by the routing engine, contacts received at the server to resources of a contact center based on the outputs received at the routing engine from the first and second algorithms.

As can be appreciated by one of skill in the art, more than two algorithms can be mixed by applying a single mixing mechanism repeatedly. Furthermore, a contact is understood herein to include voice calls, emails, chat, video calls, fax, Instant Messages (IMs), collaboration software, desktop sharing, conferences, and combinations thereof. Accordingly, a contact center may be equipped to handle any one or a number of the above-noted contact types. Furthermore, the act of routing contacts in the contact center will vary according to the contact type. For example, the routing of real-time or near-real-time contacts (e.g., voice calls, chats, video calls, IMs, etc.) may comprise establishing a communication channel between the customer's communication device and a communication device operated by a human contact center agent. The communication channel may then be used by the customer and human contact center agent to exchange messages via the selected communication medium. As another example, the routing of non-real-time contacts (e.g., emails, voicemails, faxes, etc.) may comprise transmitting a copy of the message to a communication device operated by a human contact center agent, such that the agent can review the customer's question/concern raised in the contact and generate an appropriate response.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any computing application in which it is desirable to facilitate the simultaneous and cooperative operation of multiple different and distinct algorithms.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
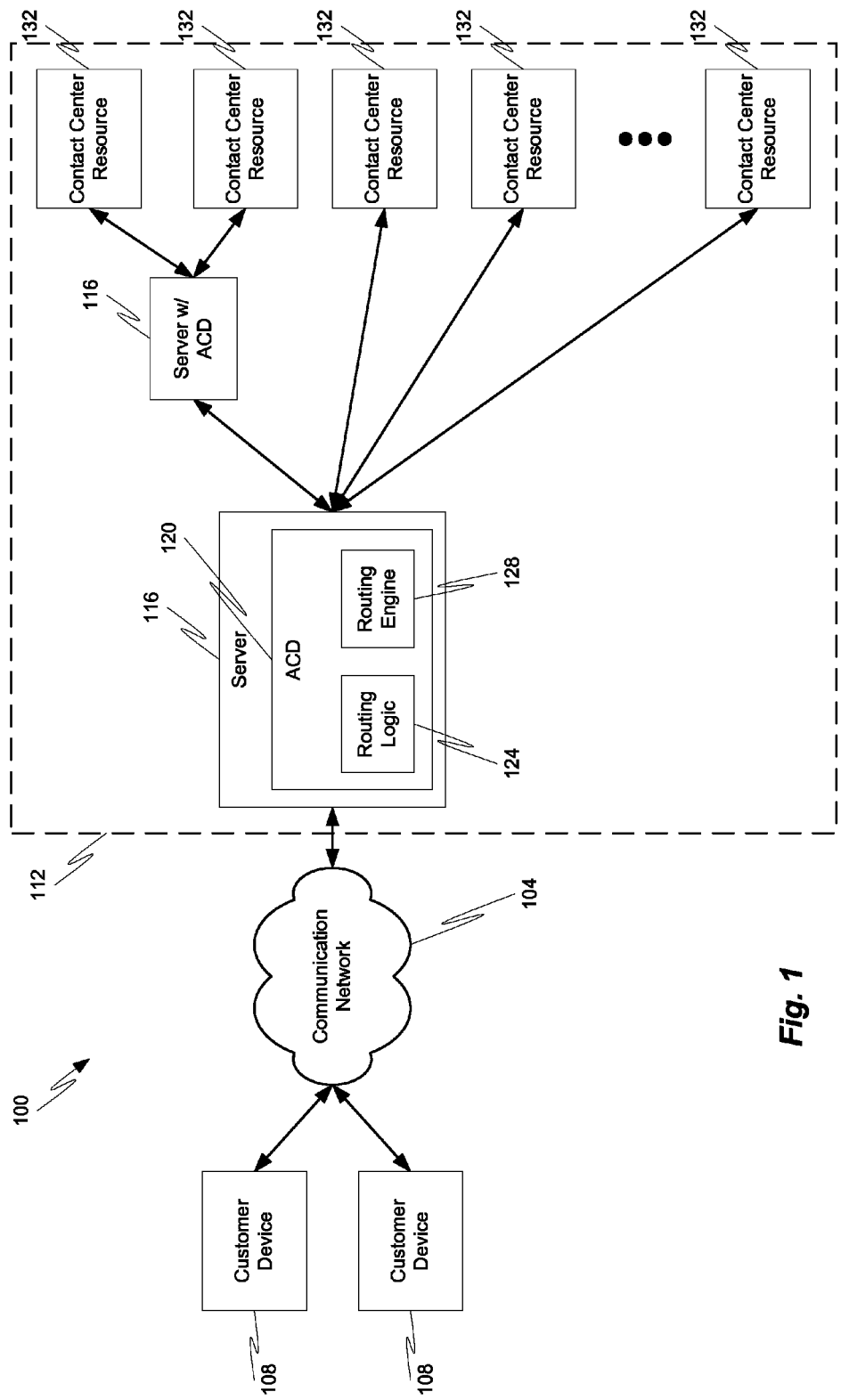
FIG. 1 is a block diagram depicting a communication system in accordance with embodiments of the present invention.

FIG. 1 shows an illustrative embodiment of a communication system 100 in accordance with at least some embodiments of the present invention. The communication system 100 generally comprises a communication network 104 interconnecting a plurality of customer communication devices 108 with a contact center 112.

The communication network 104 may comprise any type of known communication medium or collection of communication mediums and may use any type of protocols to transport messages between communication devices. The communication network 104 may include wired and/or wireless communication technologies. The Internet is an example of the communication network 104 that constitutes and IP network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication mediums such as coaxial cable, copper cable/wire, fiber-optic cable, antennas for transmitting/receiving wireless messages, and combinations thereof.

The contact center 112 may comprise a number of resources for automating the distribution of contacts received at the contact center to various resources of the contact center 112. More specifically, the contact center 112 may comprise one or more servers 116 adapted to route contacts within the contact center 112. In accordance with at least some embodiments of the present invention, the servers 116 may comprise an ACD 120 for executing the various contact routing functions as described herein. In some embodiments, the contact center 112 may comprise a single server 116 and a single ACD 120. In other embodiments, the contact center 112 may comprise a plurality of servers 116 and/or ACDs 120 in which case the contact center 112 may be a distributed contact center. The servers 116 of the contact center may be in communication with one another via a communication link established over any type of known communication medium. In some embodiments, the servers 116 may be in disparate locations. Furthermore, it may be possible that the servers 116 are separated by an ocean or other large distance, in which case a transoceanic connection may be established between the servers 116.

The ACDs 120 of the contact center 112 may comprise routing logic 124 and a routing engine 128 for analyzing contact received at the contact center, determining where to route the contact based on one or more of the customer's needs/desires (e.g., language needs, efficient resolution needs, etc.), the contact center's needs/desires (e.g., minimize costs, maximize profitability, minimize customer wait time, maximize agent utilization, etc.), and other business concerns (e.g., fairness to other customers and the like). In some embodiments, the routing engine 128 may also be referred to as a work item distributor.

The routing logic 124 contains the instructions of the ACD 120 which are executed to make routing decisions for the contacts and the routing engine 128 is the physical components of the ACD 120 which implement the decisions of the routing logic 124. In some examples, the routing engine 128 may include a switching fabric or the like for establishing real-time connections between a customer and contact center agent via the server 116. In other examples, the routing engine 128 may include a communication interface and port adapted to generate one or more messages for transmission to a contact center agent. In other embodiments, the routing engine 128 may comprise a proxy server functionality for establishing a communications channel between the customer and contact center agent.

Regardless of the implementation of the routing engine 128, the server 116 is generally responsible for distributing the contacts received from various customer (via the use of a customer communication device 108) throughout the various contact center resources 132. In some embodiments the contact center resources 132 comprise communication devices that are operated by human agents. Other exemplary contact center resources 132 include, without limitation, IVRs, recording servers, wait treatment devices (e.g., music on hold devices), fax machines, printers, and the like.

The communication devices 108, 132 may correspond to communication devices or endpoints used by human users or automated users. Examples of a suitable communication device include, but are not limited to, a personal computer, laptop, Personal Digital Assistant (PDA), cellular phone, smart phone, telephone, mobile email retrieval device, or combinations thereof. In general, a number of communication devices may be associated with a single user and provisioned rules may be employed to intelligently route communications to/from the multiple communication endpoints of the user. In other embodiments, a contact center resource 132 may comprise work stations employed by contact center personnel in a contact center. A single work station may be used by one or more contact center agents, although not necessarily at the same time. In other words, a work station may be shared among two or more contact center agents and those agents may access the resources of the work station by logging in to the work station with appropriate credentials.

Although not depicted, the servers may be in communication with an administrative work station that is operated by an administrative user. The administrative user may have the authority to alter certain aspects of the routing logic 124, thereby altering the routing decisions provided to the routing engine 128. In this way the administrative user may be capable of controlling the operation of the contact center 112 by adjusting the functionality of the routing logic 124 as discussed herein. The administrative user may interact with the routing logic 124 via a GUI provided on the administrative work station. The GUI may provide the administrative tools to the administrative user for controlling the settings of the routing logic 124.

Figure 2:
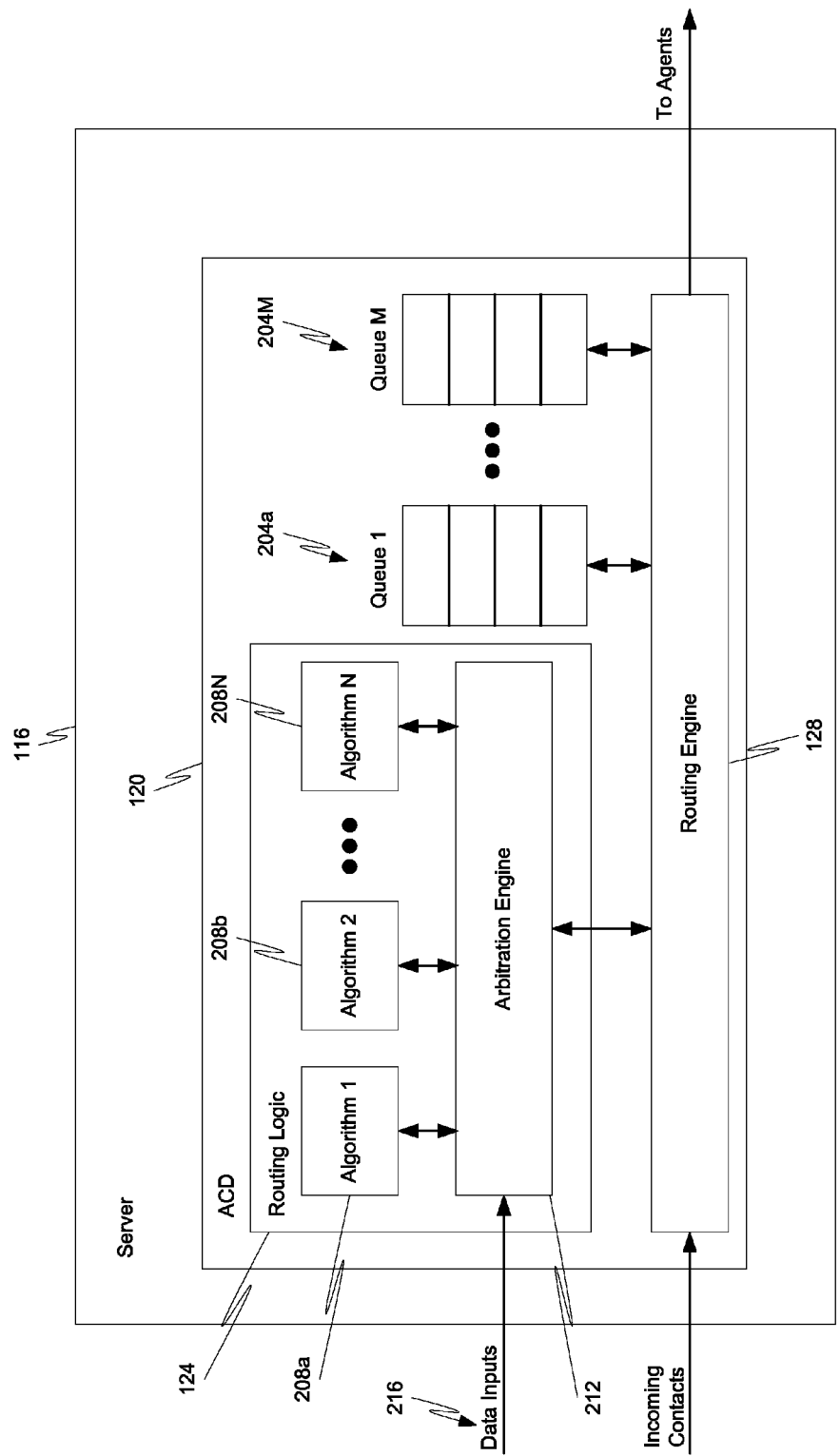
FIG. 2 is a block diagram depicting details of an ACD in accordance with embodiments of the present invention.

Referring now to FIG. 2, additional details of the server 116 will be discussed in accordance with at least some embodiments of the present invention. The ACD 120 of the server 116 includes the routing logic 124 and routing engine 128 for executing decisions made by the routing logic 124. The routing logic 124, in accordance with at least some embodiments of the present invention, may include a plurality of algorithms 208$a$-N, each of which could be used independently to make contact routing decisions. The routing logic 124 may also include an arbitration engine 212 that is adapted to coordinate the processing of the various algorithms 208$a$-N.

In accordance with at least some embodiments of the present invention, each algorithm 208 is independently capable of receiving certain data inputs from the contact center (e.g., one or more of contact center agent idle time, contact center resource idle time, contact center agent utilization, average work item processing time, average contact center agent idle time for a selected group of agents, average contact center agent idle time for all agents in the contact center, cost per processing a work item, average cost per processing a work item, customer wait time, average customer wait time for a selected group of customers, average customer wait time for all customers in the contact center, estimated customer wait time, average estimated customer wait time for a selected customer queue, and average estimated customer wait time for all contact center queues). An algorithm 208 may then process the various data inputs considered and provide an output (e.g., a routing decision). This output may then be provided to the routing engine 128 to execute the results of the output (i.e., to implement the routing decision).

As a default, each algorithm 208 would consider all data inputs provided thereto and generate an appropriate output. These algorithms 208 are designed to address particular problems or purposes and, therefore, typically treat certain inputs in a specific manner. The first algorithm 208$a$ may correspond to a business advocate-type algorithm that is capable of making contact routing decisions based on business optimization considerations (e.g., minimize costs, minimize idle agents, etc.). The second algorithm 208$b$ may correspond to a fairness-type algorithm that is capable of making contact routing decisions based on fairness concerns (e.g., FIFO). Other algorithms may consider other types of data inputs that are not considered by the first and second algorithms or may treat certain data inputs considered by one of the first or second algorithms differently than the certain data inputs are treated by other algorithms.

While each algorithm 208 may have its beneficial properties, each algorithm 208 may be deficient in some other respect. Furthermore, the algorithms 208 may have been designed with a particular purpose or problem in mind. Once that problem or purpose changes, it has been traditionally necessary to construct a new algorithm for the new problem. As can be appreciated, this process of constructing a new algorithm takes a significant amount of time. Accordingly, in accordance with at least some embodiments of the present invention, the arbitration engine 212 is adapted to allow multiple different algorithms 208 to operate concurrently and produce a single routing decision through cooperation imposed by the arbitration engine 212.

In accordance with at least some embodiments of the present invention, the various data inputs 216 that would be provided directly to the algorithms 208a-N by default (i.e., if an algorithm 208 was operating independently as the routing logic 124) are provided to the arbitration engine 212. The arbitration engine 212 is capable of receiving user preferences for the desired level of cooperation between the various algorithms 208 and selectively providing the data inputs 216 to the algorithms 208a-N based on such information. More specifically, the arbitration engine 212 can implement a mixed algorithm by invoking two or more existing algorithms 208 at substantially the same time.

Furthermore, while each algorithm 208, by default, would prefer to process a particular set of data inputs, the arbitration engine 212 can reduce the number of data inputs provided to a particular algorithm 208 to limit that algorithm's impact on the ultimate routing decision made by the routing logic 124. This particular feature is more apparent when a single data input would, by default, be considered by two different algorithms (e.g., first and second algorithms 208a, 208b). In accordance with at least some embodiments of the present invention, the arbitration engine 212 is adapted to determine whether the first algorithm 208a will preempt the second algorithm 208b with respect to processing the input or whether the second algorithm 208b will preempt the first algorithm 208a with respect to processing the input. Based on this determination, the arbitration engine 212 can provide the conflicted data input to either the first algorithm 208a or second algorithm 208b without providing it to the other algorithm. This allows the arbitration engine 212 to limit the functionality of the various algorithms 208 in an attempt to create a mixed algorithm that behaves according to user preferences.

Depending upon the inputs received at the algorithms 208a-N from the arbitration engine 212, the algorithms 208a-N will process the inputs and generate independent outputs. These outputs are provided to the arbitration engine 212, which may then be capable of providing all inputs separately to the routing engine 128, where results of each separate output are implemented. In an alternative embodiment, the arbitration engine 212 may be adapted to receive all of the outputs from the algorithms 208a-N and generate a single output for transmission to the routing engine 128. In accordance with at least some embodiments of the present invention, the arbitration engine 212 may be adapted to reconcile any conflicts between the algorithmic outputs when generating the single output. In this manner, a single unified set of instructions can be provided to the routing engine 128 to invoke the functionality of the routing engine (i.e., to route contacts).

In accordance with at least some embodiments of the present invention, the routing engine 128 may automatically route the contact to an available contact center resource 132. In other embodiments, particularly when no qualified resource is currently available, the contact may be placed into a wait queue 204. In some embodiments the ACD 120 may comprise a plurality of queues 204a-M, some of which possibly correspond to a different customer need, some of which possibly correspond to a different contact media-type medium, and some of which possibly correspond to different customer preferences. These types of queues are generally referred to as customer skill queues. Some of the queues 204a-M may also correspond to queues for contact center resources (e.g., agent queues). It may also be possible to maintain some or all of the queues 204a-M separate from the ACD 120 and/or server 116.

The routing engine 128 may be adapted to re-organize the order of contacts or work items (i.e., logical place holders in the queue corresponding to work items escalated by a customer contact received at the contact center 112). In some embodiments, the queues 204a-M may be re-organized based on the output(s) received from the arbitration engine 212.

Figure 3:
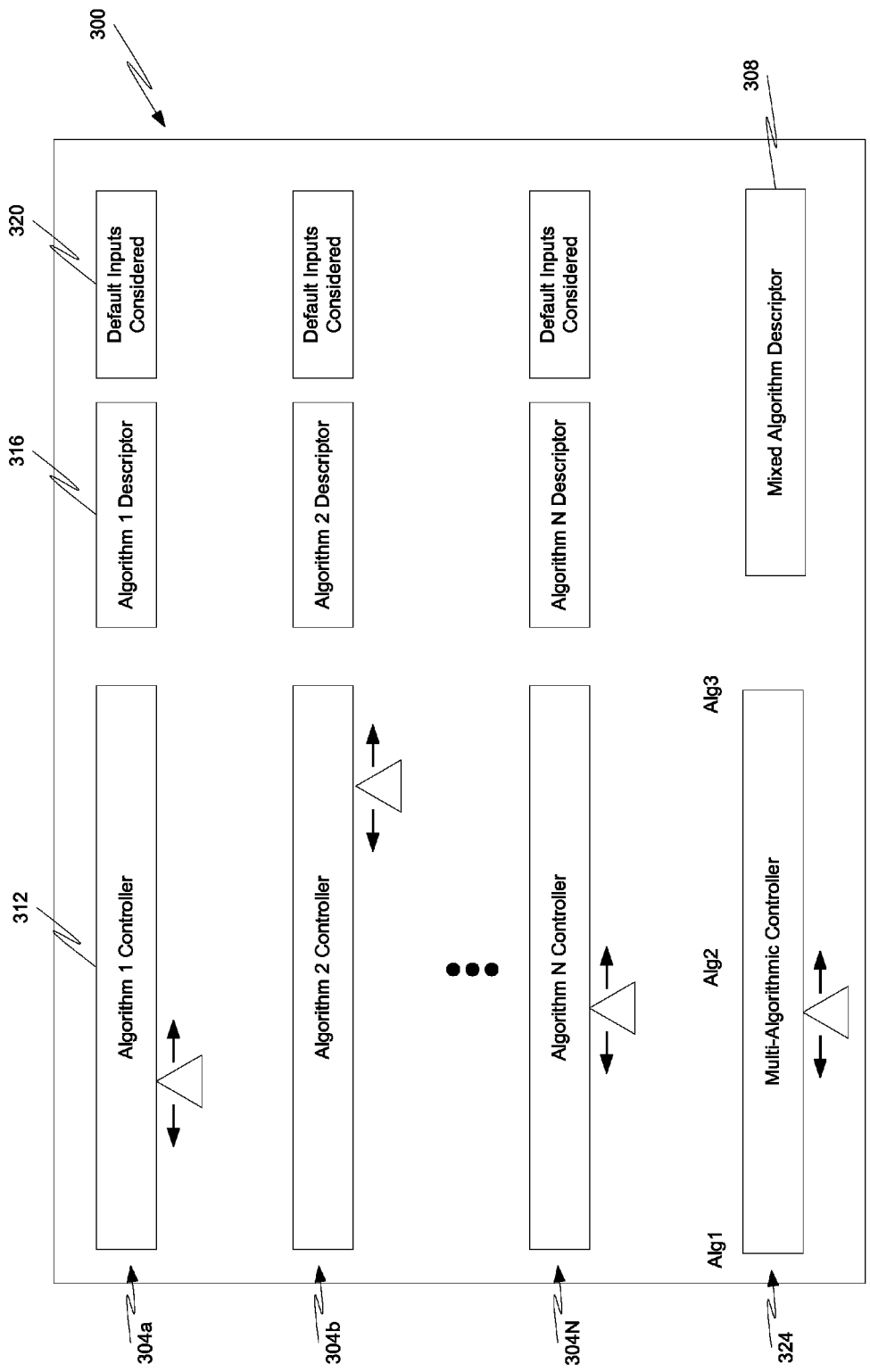
FIG. 3 is a block diagram depicting an exemplary user interface for administering a mixed algorithm in accordance with embodiments of the present invention.

With reference now to FIG. 3, an exemplary User Interface (UI) 300, such as that which may be utilized on an administrative work station, will be described in accordance with at least some embodiments of the present invention. The UI 300 may include a number of different fields 304a-N for controlling the relative operation of each algorithm 208a-N in the routing logic 124. In accordance with at least some embodiments of the present invention, each controlling field 304 may comprise an algorithm controller 312 that allows the administrative user to control the proportion of the algorithm that will be utilized in the mixed algorithm. The algorithm controller 312 can also be thought to control the relative weight that will be assigned to each algorithm in connection with creating the mixed algorithm.

In accordance with at least some embodiments of the present invention, the administrative user may adjust a scroll selector on the algorithm controller 312 for each of the algorithms. The weights assigned via the controller 312 can be used by the arbitration engine 212 to resolve algorithmic conflicts. For instance, if a first algorithm 208a is adapted to consider a first set of data inputs (a, b, c, d, e) by default and the second algorithm 208b is adapted to consider a second set of data inputs (b, e, f, g) by default, then the relative weight assigned by the administrative user to the first and second algorithms 208a, 208b, respectively, can be used to resolve the conflict with respect to data inputs (b, e). Specifically, if the first algorithm 208a is selected to have a higher relative weight or proportion than the second algorithm 208b, then the arbitration algorithm may provide data inputs (b, e) to the first algorithm 208a.

In one possible variation, however, it may be possible that one of the conflicting data inputs (b) is more important to the decision making process of the second algorithm 208b than the first algorithm 208a. In this situation, the arbitration algorithm 212 may decide to send data input (b) to the second algorithm 208b and data input (e) to the first algorithm unless the second algorithm 208b is given a zero weight or the weight of the first algorithm 208a substantially outweighs the weight of the second algorithm 208b (e.g., the weight assigned to the first algorithm 208a is more than twice as great as the weight assigned to the second algorithm 208b). All of these various considerations and manipulation tools allow an administrative user to generate, real-time, a number of mixed algorithms based on currently available and distinct algorithms 208a-N.

In addition to comprising the algorithm controllers 312, the controlling fields 304 may also comprise an algorithm descriptor field 316 for providing a description of the features of the associated algorithm and a data inputs considered field 320 for describing what data inputs are considered by said algorithm by default. In certain embodiments the UI 300 may also include a mixed algorithm descriptor field 308 that provides a location for describing the general operation of the mixed algorithm based on the user's current selection of the algorithm controllers 312. More specifically, the mixed algorithm descriptor field 308 may provide a qualitative description of the type of data inputs that will be considered, how such data inputs will be considered, and how conflicts between algorithms, if any, will be resolved. Furthermore, the mixed algorithm descriptor field 308 may qualitative state how the mixed algorithm will behave (e.g., "heavily consider business objectives", "case look at the 'profit goals', if the goals are being met, then give more 'fairness', if profit goals are not being met, then be 'less fair'", or other similar qualitative statements). This descriptor field 308 can be used as a feedback to the administrative user before implementing a mixed algorithm.

Another exemplary control input is a multi-algorithmic controller field 324. The multi-algorithmic controller field 324 can be used to receive a single user input for simultaneously controlling two, three, four, or more algorithms 208 at the same time. In accordance with at least some embodiments of the present invention, the multi-algorithmic controller field 324 can simultaneously control, with a single input, how several algorithms 208 will be have cooperatively. The inputs from this controller field 324 can be supplied directly to the arbitration engine 212 for coordinating the algorithmic behaviors. As one exemplary embodiment, the algorithms 208 can be ordered on the controller field 324 such that the center algorithm (e.g., Alg2) participates as the right algorithm when the slider is between Alg1 and Alg2 (also note that in this depicted position Alg3 is ignored). Alternatively, if the slider was positioned between Alg2 and Alg3, then Alg1 may be ignored. If the slider was positioned directly underneath Alg2, then both Alg1 and Alg3 may be ignored (i.e., the arbitration engine 212 may only provide data inputs 216 to the second algorithm 208b) or both Alg1 and Alg3 may be included as supplementary algorithms to Alg2 (i.e., inputs 216 not ordinarily processed by the second algorithm 208b may be provided to either Alg1 or Alg3). As can be appreciated, more than three algorithms can be simultaneously controlled by the multi-algorithmic controller field 324.

Figure 4:
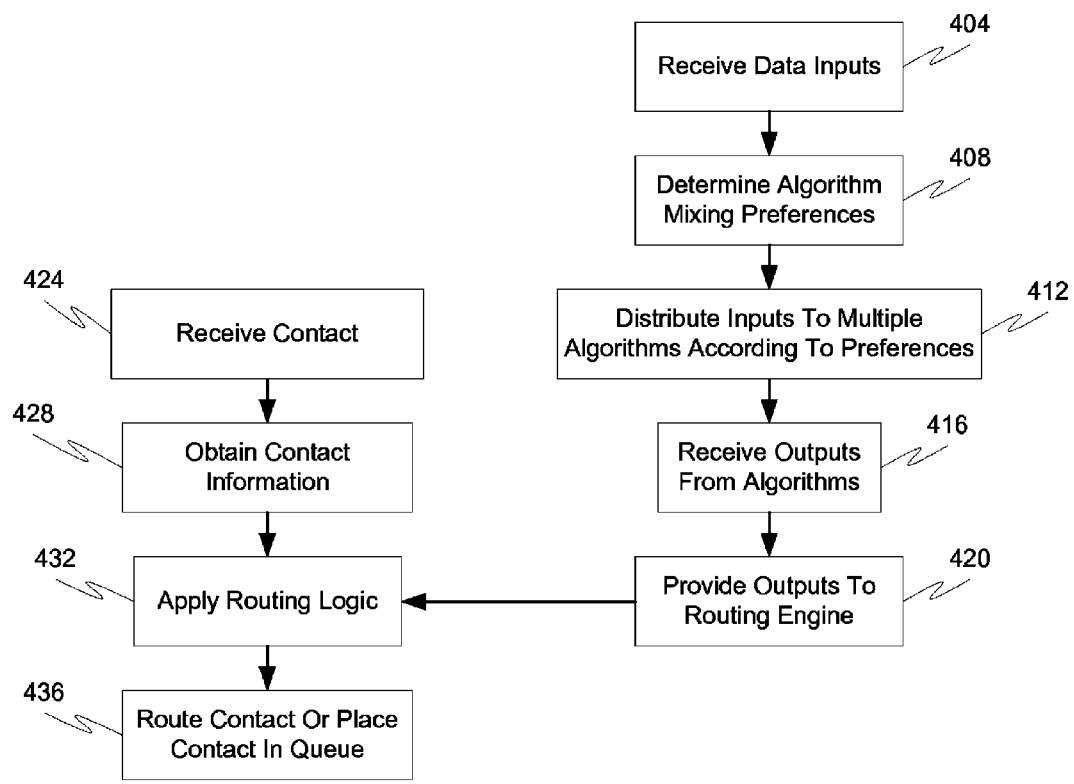
FIG. 4 is a flow diagram depicting an exemplary contact processing method in accordance with embodiments of the present invention.

With reference now to FIG. 4, an exemplary method of implementing a mixed contact routing algorithm will be described in accordance with at least some embodiments of the present invention. The method is initiated by receiving data inputs 216 at the routing logic 124 (step 404). The arbitration engine 212 then receives user preferences for a mixed algorithm and determines how to implement such preferences (step 408). In accordance with at least some embodiments, the determination of the mixing preferences is generally executed by analyzing the user preferences for each of the various algorithms 208a-N and resolving any conflicts between the algorithms based on the user preferences.

This determination results in the arbitration engine 212 distributing the various data inputs 216 among the algorithms 208a-N selected by the user (step 412). In some embodiments, the arbitration engine 212 only sends a single instance of a particular data input, if at all, to a single algorithm 208. In other embodiments, the arbitration engine 212 may be adapted to send a single instance of a particular data input to a plurality of the algorithms 208, in which case the arbitration engine 212 may be required to resolve conflicting outputs of the various algorithms 208.

Accordingly, the method continues with the active algorithms 208 processing the inputs received from the arbitration engine 216 and generating individual outputs, which are provided back to the arbitration engine 216 (step 416). The received outputs can then be provided individually or collectively as a single combined output to the routing engine 128 (step 420).

Meanwhile, contacts are received at the contact center 112 (step 424). These contacts may be either real-time contacts (e.g., voice or video contacts), near-real-time contacts (e.g., chats, IMs, etc.), or non-real-time (e.g., emails, twitter feeds, contacts. Upon receiving the contacts, contact information may be obtained from the contact (step 428). In some embodiments, this step may involve the ACD 120 receiving the contact and automatically forwarding the contact to an IVR, where certain contact data can be automatically retrieved. Once the IVR has completed processing the contact and retrieving the necessary information (e.g., customer identity, customer needs, customer information, and other information that may be useful in processing the contact), the contact may be sent back to the ACD 120 for routing to another contact center resource 132. In other embodiments, the ACD 120 may perform the initial analysis of the contact in an attempt to retrieve certain contact information. The type of information that may be retrieved by the ACD 120 includes, but is not limited to, caller identification, contact media type, urgency, etc. Furthermore, if the contact is received from a previous or known customer of the contact center 112, then the ACD 120 may be adapted to refer to a database with some amount of information obtained from the contact (e.g., IP address, caller ID number, etc.). The obtained information can be used as a mapping to additional information that is stored in the database, thereby allowing the ACD 120 to obtain a significant amount of customer/contact data without necessarily invoking the IVR.

After the desired contact information has been obtained, the method continues with the routing engine 128 applying the routing logic received from the arbitration engine 212 (step 432). During this application of the routing logic, the routing engine 128 may be adapted to either route the contact to a contact center resource 132, such as a communication device operated by a human agent, or place the contact in a queue 204 for eventual routing to a contact center resource 132 (step 436). The actions taken in this particular step may vary depending upon the state of the contact center 112, that state of the contact center resources 132, the needs of the customer, and other defined goals.

As can be appreciated by one skilled in the art, various steps and series of steps may be continuously performed (e.g., an administrator may be allowed to alter algorithm mixing preferences) in which case other steps may also be re-performed or executed.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA®, or a domain specific language, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for creating a customized algorithm and executing such an algorithm based on a mixture of existing algorithms. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
receiving, at a server comprising a routing engine, one or more data inputs that describe conditions related to a contact center, wherein the server comprises a first algorithm configured to consider a first set of inputs when generating an output and a second algorithm configured to consider a second set of inputs when generating an output, wherein the first set of inputs are a subset of the one or more data inputs, and wherein the second set of inputs are a subset of the one or more data inputs;
providing a first selected portion of the one or more data inputs to the first algorithm;
providing a second selected portion of the one or more data inputs to the second algorithm;
receiving, at the routing engine, outputs from the first and second algorithms, wherein the output of the first algorithm is based on the first algorithm processing the first selected portion of the one or more data inputs, and wherein the output of the second algorithm is based on the second algorithm processing the second selected portion of the one or more data inputs;
making a single routing decision for a contact received at the server, the single routing decision being simultaneously based on the outputs received from the first and second algorithms; and
implementing, by the routing engine, the single routing decision by assigning the contact to a resource of a contact center.

2. The method of claim 1, wherein the first and second set of inputs are not coextensive.

3. The method of claim 1, wherein a first input in the one or more data inputs is in the first set of inputs and the second set of inputs by default.

4. The method of claim 3, further comprising:
determining, by an arbitration engine, whether the first algorithm will preempt the second algorithm with respect to processing the first input or whether the second algorithm will preempt the first algorithm with respect to processing the first input;
determining, by the arbitration engine, that the first algorithm will preempt the second algorithm; and
including, by the arbitration engine, the first input in the first selected portion of the one or more data inputs and not in the second selected portion of the one or more data inputs.

5. The method of claim 4, wherein the arbitration engine receives outputs from the first and second algorithms based on the first and second algorithms processing the first selected portion and second selected portion of the one or more data inputs; respectively, and provides said outputs to the routing engine.

6. The method of claim 1, further comprising:
receiving, from a user, preferences related to utilizing the first and second algorithm; and
altering the first selected portion and second selected portion of the one or more data inputs provided to the first and second algorithms, respectively, based on the preferences received from the user.

7. The method of claim 1, wherein the one or more data inputs comprise one or more of contact center agent idle time, contact center resource idle time, contact center agent utilization, average work item processing time, average contact center agent idle time for a selected group of agents, average contact center agent idle time for all agents in the contact center, cost per processing a work item, average cost per processing a work item, customer wait time, average customer wait time for a selected group of customers, average customer wait time for all customers in the contact center, estimated customer wait time, average estimated customer wait time for a selected customer queue, and average estimated customer wait time for all contact center queues.

8. The method of claim 7, wherein the first algorithm and the second algorithm are both adapted; by default, to at least consider customer wait time, wherein the customer wait time data input is provided to the first algorithm and not the second algorithm based on determining that the first algorithm is to preempt the second algorithm with respect to considering customer wait time.

9. A server, comprising:
a processor configured to execute instructions; and
a non-transitory computer-readable storage medium comprising processor-executable instructions stored thereon, the instructions including:

a first algorithm configured to consider a first set of inputs when generating an output;

a second algorithm configured to consider a second set of inputs when generating an output, wherein the first set of inputs are a first subset of all data inputs received at the server, and wherein the second set of inputs are a second subset of all data inputs received at the server;

an arbitration engine configured to provide a first selected portion of the data inputs to the first algorithm and provide a second selected portion of the data inputs to the second algorithm; and a routing engine configured to simultaneously receive outputs from the first and second algorithms and, based on the simultaneously received outputs from the first and second algorithms, make a routing decision, wherein the output of the first algorithm is based on the first algorithm processing the first selected portion of the one or more data inputs, wherein the output of the second algorithm is based on the second algorithm processing the second selected portion of the one or more data inputs, and wherein the routing engine is further configured to route contacts received at the server to resources of a contact center based on the outputs simultaneously received from the first and second algorithms.

10. The server of claim 9, wherein the first and second sets of inputs overlap but are not coextensive, wherein a number of inputs in the first selected portion of data inputs is less than a number of inputs in the first set of inputs, and wherein a number of inputs in the second selected portion of data inputs is less than a number of inputs in the second set of inputs.

11. The server of claim 9, wherein a first input in the data inputs is in the first set of inputs and the second set of inputs by default.

12. The server of claim 11, wherein the arbitration engine is further configured to determine whether the first algorithm will preempt the second algorithm with respect to processing the first input or whether the second algorithm will preempt the first algorithm with respect to processing the first input, determine that the first algorithm will preempt the second algorithm, and include the first input in the first selected portion of data inputs and not in the second selected portion of data inputs.

13. The server of claim 12, wherein the arbitration engine receives outputs from the first and second algorithms based on the first and second algorithms processing the first selected portion and second selected portion of the data inputs, respectively, and provides said outputs to the routing engine.

14. The server of claim 9, wherein the arbitration engine is further configured to receive, from a user, preferences related to utilizing the first and second algorithm and alter the first selected portion and second selected portion of the one or more data inputs provided to the first and second algorithms, respectively, based on the preferences received from the user.

15. The server of claim 9, wherein the one or more data inputs comprise one or more of contact center agent idle time, contact center resource idle time, contact center agent utilization, average work item processing time, average contact center agent idle time for a selected group of agents, average contact center agent idle time for all agents in the contact center, cost per processing a work item, average cost per processing a work item, customer wait time, average customer wait time for a selected group of customers, average customer wait time for all customers in the contact center, estimated customer wait time, average estimated customer wait time for a selected customer queue, and average estimated customer wait time for all contact center queues.

16. The server of claim 9, further comprising:
at least a third algorithm configured to consider a third set of inputs when generating an output;
at least a first communication port configured to connect the server with a communication network;
at least a second communication port configured to connect the server with one or more resources in the contact center, wherein the one or more resources comprise at least one communication device operated by a human contact center agent;
at least one work item queue configured to maintain work items corresponding to contact received at the contact center in a logical order, wherein the logical order of the work item queue is defined by the outputs of the first and second algorithms received at the routing engine; and
at least one agent queue configured to maintain a logical order of contact center agents eligible to receive work items.

17. A computer program product comprising computer executable instructions stored onto a non-transitory computer readable medium which, when executed by a processor of a computer, cause the processor to execute a method, the method comprising:
receiving one or more data inputs that describe conditions, wherein a first algorithm is configured to consider a first set of inputs when generating an output and a second algorithm is configured to consider a second set of inputs when generating an output, wherein the first set of inputs are a subset of the one or more data inputs, and wherein the second set of inputs are a subset of the one or more data inputs;
providing a first selected portion of the one or more data inputs to the first algorithm;
providing a second selected portion of the one or more data inputs to the second algorithm;
receiving, at substantially the same time, outputs from the first and second algorithms, wherein the output of the first algorithm is based on the first algorithm processing the first selected portion of the one or more data inputs, and wherein the output of the second algorithm is based on the second algorithm processing the second selected portion of the one or more data inputs;
making a single routing decision for a contact based on the outputs received from the first and second algorithms; and
based on the single routing decision, assigning the contact to a resource.

18. The computer program product of claim 17, wherein the contact is routed to the assigned resource, wherein the first and second sets of inputs overlap but are not coextensive, wherein a number of inputs in the first selected portion of one or more data inputs is less than a number of inputs in the first set of inputs, and wherein a number of inputs in the second selected portion of one or more data inputs is less than a number of inputs in the second set of inputs.

19. The computer program product of claim 17, wherein a first input in the data inputs is in the first set of inputs and the second set of inputs by default.

20. The computer program product of claim 19, wherein the method further comprises:
determining whether the first algorithm will preempt the second algorithm with respect to processing the first input or whether the second algorithm will preempt the first algorithm with respect to processing the first input;

determining that the first algorithm will preempt the second algorithm; and including the first input in the first selected portion of one or more data inputs and not in the second selected portion of one or more data inputs.

\* \* \* \* \*